Aug. 23, 1932.    R. J. ALTGELT ET AL    1,873,253
POWER LIFT MECHANISM FOR PLOWS
Filed March 17, 1930    3 Sheets-Sheet 1

Inventors
Rudolph J. Altgelt
& Cameron H. Gemberling
By. John P. Smith
Atty.

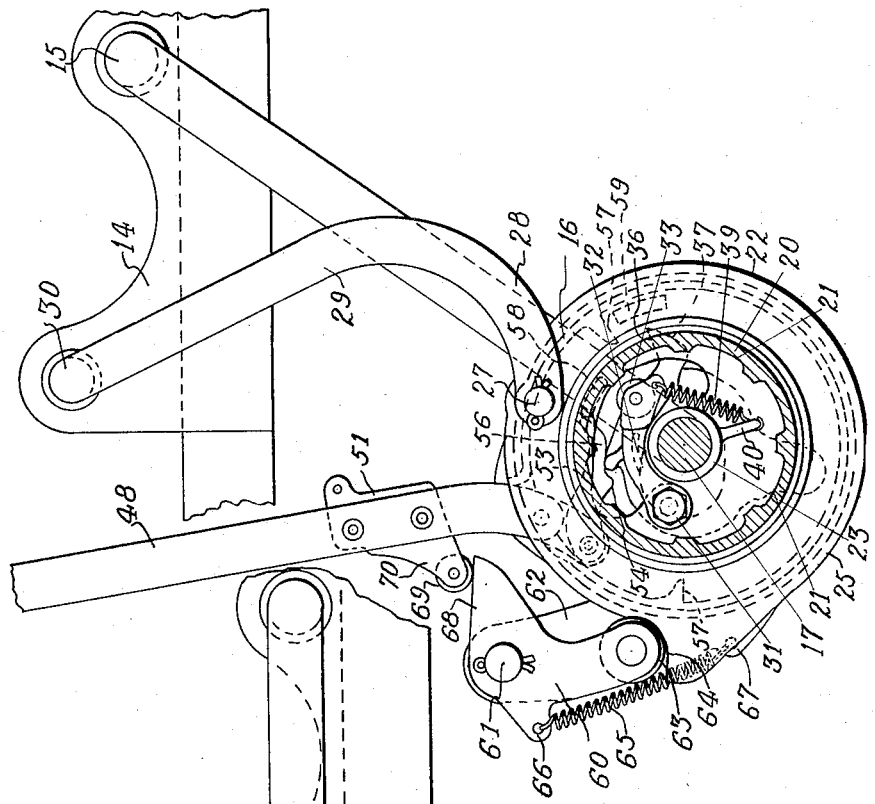

Aug. 23, 1932.   R. J. ALTGELT ET AL   1,873,253
POWER LIFT MECHANISM FOR PLOWS
Filed March 17, 1930   3 Sheets-Sheet 3
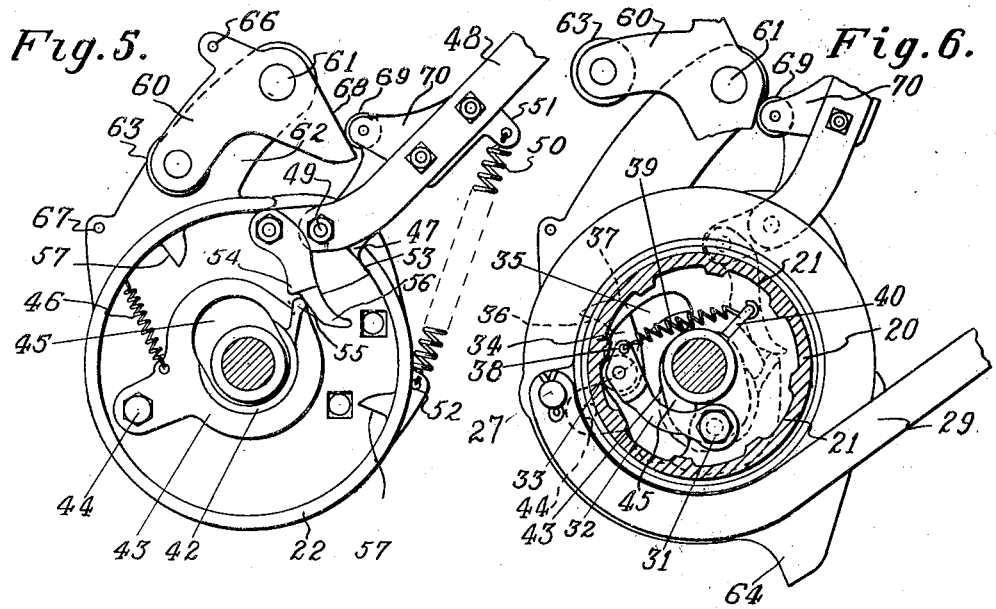
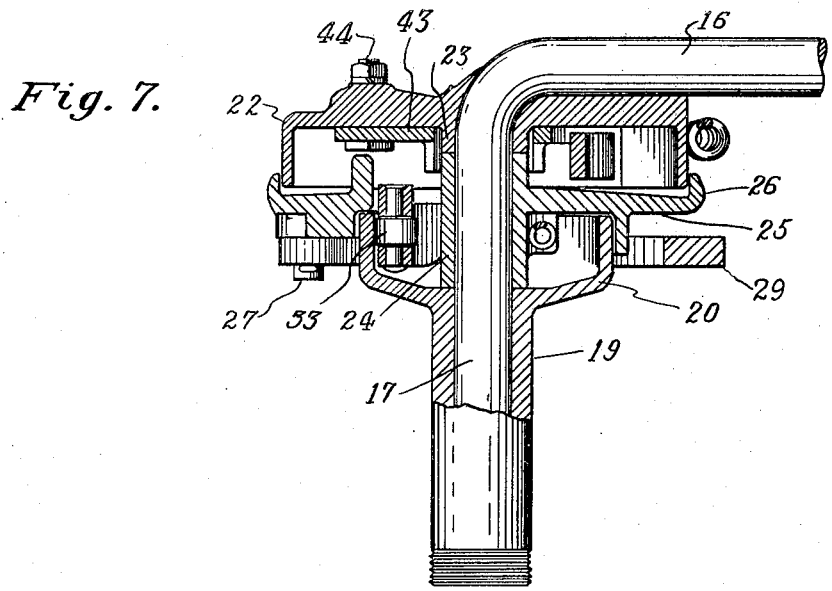
Inventors
Rudolph J. Altgelt
& Cameron H. Gemberling
By John P. Smith
Atty.

Patented Aug. 23, 1932

1,873,253

UNITED STATES PATENT OFFICE

RUDOLPH J. ALTGELT AND CAMERON H. GEMBERLING, OF SOUTH BEND, INDIANA, ASSIGNORS TO OLIVER FARM EQUIPMENT COMPANY, A CORPORATION OF DELAWARE

POWER LIFT MECHANISM FOR PLOWS

Application filed March 17, 1930. Serial No. 436,339.

This invention relates to improvements in power lift mechanism for plows, of the type in which power derived from the carrying wheels is utilized directly to raise the plow frame.

Our present invention has special reference to clutch devices whereby the carrying wheel is operatively connected with or disconnected from the lifting elements.

The present invention is directed to an improvement on the structure of power lift mechanism for plows described and claimed in the U. S. Letters Patent to Herman E. Altgelt No. 1,453,537 dated May 1, 1923 and the patent to Rudolf J. Altgelt et al, No. 1,496,441, dated June 3, 1924.

The construction disclosed in these two patents is directed to a power lift mechanism in which the lifting arm at one end thereof is pivotally connected to a bearing on the plow frame and the other end thereof is pivoted to a lifting disc which is in turn actuated by the land wheel of the plow through the clutch mechanism for the purpose of raising the plow structure. These patents particularly disclose a lifting arrangement which maintains the plow in an elevated position by means of the lower end of the lifting arm locking at a point slightly beyond centers or in other words, locking just slightly beyond dead center. The plow in this arrangement is dropped to its working or lowered position by forcing the lifting arm back over dead center after which gravity causes the plow structure, including the bases and beams, to fall. The power lift device disclosed in these patents works very satisfactorily on all small plows, but for the heavy type plow this particular arrangement is objectionable because it requires too much power on the part of the operator to pull the trip rope or lever when he desires to drop the plow to working position because it becomes necessary to actually raise the plow structure about an eighth of an inch or more in effecting or raising the lower end of the lifting arm over dead center.

It is therefore the primary object of the present invention to overcome these difficulties herein above pointed out and provide an arrangement whereby a novel and improved clutch mechanism and locking arrangement locks the lower end of the lifting arm at a position slightly short of dead center or slightly short of a straight line passing between the land wheel axle and the main frame bearing of the lifting arm.

These and other objects are accomplished in a manner hereinafter described and particularly pointed out in the appended claims.

Referring to the drawings:

Fig. 3 is an enlarged fragmentary and partly cross-sectional view of the power lift mechanism showing the plow in its lowered position;

Fig. 4 is an enlarged fragmentary and partly cross-sectional view showing the position of the different parts of the power lift mechanism when the plow is in a raised position;

Fig. 5 is an enlarged fragmentary and detailed view showing the clutch housing and parts carried thereby;

Fig. 6 is an enlarged side-elevational view, partly in cross-section showing the position which the parts assume when the plows are in their lowered or working position; and Fig. 7 is an enlarged transverse and partly cross-sectional view taken on a horizontal line passing through the axis of the wheel.

We have shown the plow frame as comprising a beam 10, the latter being provided at its rear end with a standard 12, to which the plow base 13 is secured. It is understood, however, that the frame may comprise a plurality of beams suitably spaced and each plow beam carrying a plow base. The invention in the present instance is more advantageously used in connection with a plurality of plow bases or heavy type plows, but for the purpose of illustrating the invention is shown in connection with a relatively light two base plow.

Figure 1:
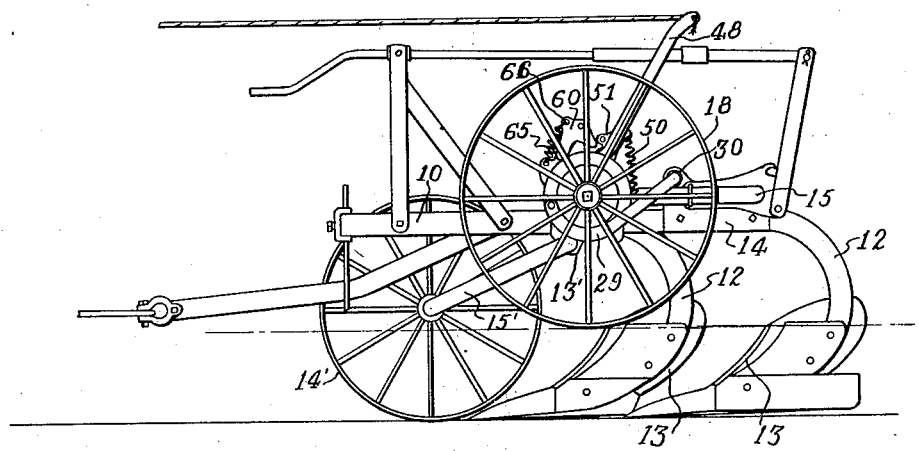
Fig. 1 is a side-elevational view of a conventional form of plow, having our improved power lifting mechanism embodied therein.
Figure 2:
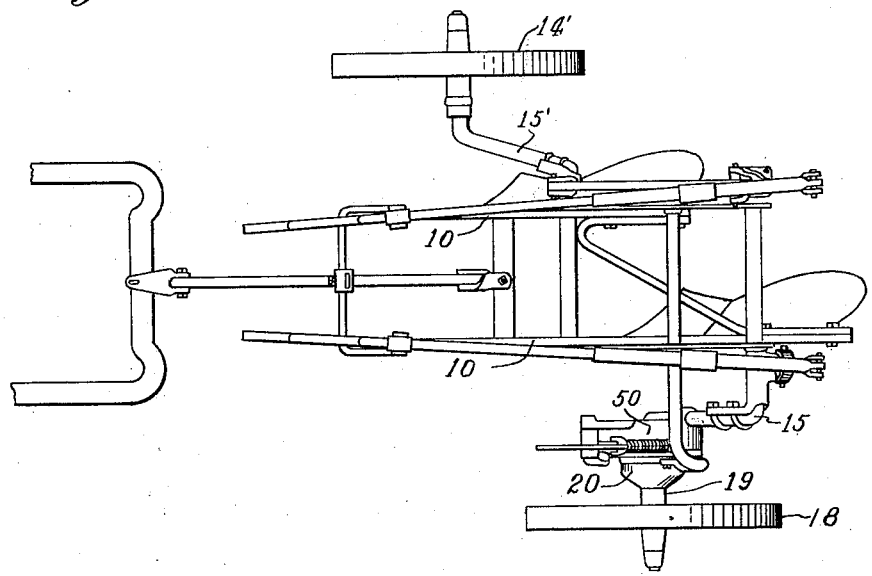
Fig. 2 is the top plan view of the same.

In the embodiment of the invention shown in the drawings, the bearing brackets, indicated at 14, are secured to the frame for the accommodation of the crank axle. The land wheel crank axle 15 is mounted in the rear portions of the bearing brackets 14 as indicated in Figs. 1 and 2 and the furrow wheel crank axle 15' which carries the furrow wheel 14' is mounted in suitable brackets 13' secured to the plow frame. At the free end 16 of the crank axle 15, a spindle portion 17 is provided for the accommodation of the land wheel 18. The hub box 19 (see Fig. 7) is provided at its inner end with a flanged portion 20 having an interior annular series of corrugations or recesses 21 for cooperation with the clutch mechanism hereinafter described; said flanged portion constituting in effect part of such clutch mechanism.

Rigidly secured to the land wheel axle so as to encircle the spindle portion thereof, is a flanged disc or housing 22; said housing being provided centrally with a hub portion 23 encircling said spindle. Journaled on the spindle 17 and mounted between the housing 22 and the hub 19 is a barrel or bearing portion 24 of the lifting member or disc 25. The lifting disc 25 is provided with a peripheral flange 26 which encircles the flange of the housing 22. The lifting disc 25 is provided with a pin 27 on which the lower end of the curved portion 28 of the lifting arm 29 is pivotally connected; said lifting arm having pivotal connection with the plow frame as at 30 to the forward end of the brackets 14 so that when the lifting disc is turned in one direction, motion will be transmitted through the medium of the lifting arm 29 to the frame to raise the same until the connection of said arm at 27 on the lifting disc shall have approached the position slightly short of dead center. Dead center will, of course, be on the straight line passing through the axis of the spindle 16 and the axis of the bearing 30 of the lifting arm 29. When these positions shall have been reached, the plow frame will be raised to its elevated position and locked in said position by the mechanism hereinafter described.

The lifting disc 25 has pivoted thereto at 31 a curved roller dog 32 which carries near its free end a roller 33 and the free end of the dog is provided integrally with a lug or projection 34, which extends through an opening 35 on the lifting disc 25. The lug 34 is provided with a straight face as shown at 36 and a curved face 37. The free end portion of the dog 32 is provided with an ear 38 with which one end of a spring 39 is connected, the other end of the spring being attached to a lug 40 on the lifting disc adjacent the hub portion thereof. The spring 39 serves to normally hold the roller dog in the position shown in Figs. 3 and 4, but means are provided for moving said roller dog against the resistance of said spring so as to cause the roller to engage in one or another of the corrugations or recesses 21 in the hub 20 associated and rotatable with the land wheel 18 and thus operatively connect the lifting disc with the land wheel. The roller dog 32 is provided with an inwardly curved projecting cam or flange 41 which partially embraces a curved cam or flange 42 on the plate lever 43, which in turn is pivotally attached at 44 to the housing member 22. Said plate lever 43 is provided with an elongated opening 45 for the accomodation of the hub of said housing and to permit the oscillating movement of said lever plate. The lever plate 43 is retained in its normal position by means of a spring 46 and when said lever plate is moved from such position, its flange 42 cooperating with the flange or cam 41 of the roller dog, will cause the latter to move outwardly and its roller to engage the corrugated hub 20. The housing 22 is provided with an opening as shown at 47 in which a control lever 48 is pivotally supported as shown at 49 and held in its normal position by means of a spring 50 attached at one end of said lever by the medium of the bracket 51 and at the other end to a lug 52 on the housing 22. A dog 53 is loosely pivoted to the lower short arm of the control lever 48 and is provided with a tooth 54 to engage a lug or shoulder 55 on the free end of the lever plate 43. The dog 53 is also provided at its free end portion with an upwardly curved tongue 56. It is apparent that by operating the control lever in one direction, the engagement of the tooth 54 of the dog 53 with the lug or shoulder 55 of the lever plate 43, will cause the plate to move in a manner above described to effect the clutching with the lifting disc of the land wheel. The lug 57 located within the housing 22 is in such a position that as the lifting disc approaches the upper end of its throw, said lug will engage the face 36 on the roller dog 32 and force said roller dog inwardly to disengage roller 33 from the corrugated hub 20. The lifting disc is provided on its inner face with a lug or projection 58 which, when the lifting disc approaches the upper end of its throw during the lifting operation, will engage curved tongue 56 of the pivoted dog 53 and lift the latter out of reach of the lug or shoulder 55 on the lever plate 43. When the lifting disc reaches the end of its lifting movement, the lug or projection 58 will engage the tooth 54 of the dog 53 and further turning movement of the lifting disc will be prevented. In order to avoid depending entirely upon the engagement of the lug 58 with the tooth of the pivoted dog 53 to limit the lifting throw of the disc 25, the latter is provided on its inner face with a fixed lug 59 which is adapted to abut against the lug 57 in the housing when the lifting disc reaches the end of its lifting throw.

The construction thus far described is essentially like and operates in the manner described and claimed in the aforementioned patents and for a more detailed description of the clutch mechanism herein disclosed, reference to these patents may be had.

The essential feature of the present invention includes a means for positively locking the clutch parts and lifting arm at a position slightly short of dead center so that when the operator is desirous of releasing the locking mechanism, lowering the plows and beams to their normal operative position into the ground, it will not be necessary to burden the operator to positively lift the plow structure past or over dead center as is necessary with power lift plows heretofore constructed. The mechanism comprises a bell-crank or crank roller dog 60 which is pivoted as shown at 61 to the free end of an upwardly curved arm 62 formed integrally with the housing 22. The lower or free end of this roller crank dog 60 is provided with a roller 63 which is adapted to engage an outwardly projecting lug 64 formed on the outer periphery of the lifting plate 25. The lever crank dog 60 is normally pressed inwardly towards the spindle 16 of the crank axle 15 by a spring 65 which has one end thereof connected to a laterally extending ear 66 formed on the crank dog 60 and the other end thereof connected to an ear 67 formed on the housing 22. The crank dog 60 is provided with a rearwardly extending arm as shown at 68 which is adapted to be engaged by a roller 69, journaled between two ears 70, formed on a bracket 51 which in turn is secured to the actuating lever 48.

The operation of our improved plow construction is as follows:

When the plow beams are in their lowered or working position, the lifting mechanism will be in the positions as shown in Figs. 1, 3 and 6. Should the control lever be moved forwardly from the positions shown in Figs. 1, 3 and 6 the cooperation of the dog 53 with the lever plate 43 will cause the latter to be moved and the lifting disc to be clutched to the land wheel in the manner previously described. Rotations of the land wheel will now cause the lifting disc to be turned approximately through an arc of slightly over one hundred and eighty degrees (180°) or from the position shown in Fig. 3 to that shown in Fig. 4 during which movement the power will be transmitted through the lifting arm 29 to the frame of the plow to elevate the latter until the projecting lug 58 of the lifting disc 25 engages the curved surface 56 of the dog 53 to raise the latter out of reach of the lever plate 43; roller dog 32 will then be moved from the corrugated hub 20 (unclutching the lifting disc from the land wheel) and the tooth 54 of the now elevated dog 53 will be in the position to engage the lug or projection 55. It will be noted that as the pivotal connection 27 of the lifting arm 29 approaches the dead center or the straight line passing between the spindle 16 and the bearing center 30 of the lifting arm 29, the roller 63 will ride over the inclined projecting portion of the lug 64 and be locked therein as is clearly shown in Fig. 4 to thereby positively lock the plow frame in the elevated position so that the relative centers of the lifting arm and spindle of the axle are locked in a position slightly short of dead center. When the operator is desirous of lowering the plow base into working position, the operating lever 48 is pulled forwardly through the medium of a rope and through this action the roller 69 depresses a rearwardly extending arm 68 of the bell-crank roller dog 60, thereby disengaging the roller 63 from the lug 64 formed on the lifting plate 25 and the plow frame will then be dropped to its working position by gravity.

While in the above specification we have described one embodiment which our invention may assume in practice, it will of course be understood that the same is capable of modification and that modification may be made without departing from the spirit and scope of the invention as expressed in the appended claims:

What we claim is our invention and desire to secure by Letters Patent is:

1. In an agricultural implement in which the earth working means are raised by power and lowered by gravity, the combination with a frame, an axle, and a carrying wheel, a lifting member loosely mounted on said axle, means for locking said lifting member to said carrying wheel, a lifting arm having one end thereof pivotally connected with said frame and the other end thereof pivotally connected with said lifting member, and means for locking the lower end of said lifting arm in a position slightly short of dead center.

2. In an agricultural implement in which the earth working means are raised by power and lowered by gravity, the combination with a frame, an axle and a carrying wheel, and oscillatory lifting member on the axle, means for locking said oscillatory member to the carrying wheel, a lifting arm having one end pivotally connected to said lifting member and the other end thereof pivotally connected with said frame and a locking dog engageable with said lifting arm for locking the lower end of said lifting arm in a position slightly short of dead center.

3. In an agricultural implement of the character described, the combination with a frame, an axle and a carrying wheel, of an oscillatory lifting member loosely mounted on said axle, means for locking said member to the carrying wheel, a lifting arm having one end thereof pivotally connected to said lifting member, a housing rigidly secured to said axle, a roller dog pivotally connected to said housing, and means formed on said lifting member and engageable on said dog whereby the lower pivoted end of said lifting arm is locked in a position slightly short of the line passing through the axle center of said wheel and the axial center of the pivot of said lifting arm and frame.

4. In an agricultural implement of the character described, the combination with a frame, axle and carrying wheel, an oscillatory lifting member journaled on said axle, means for locking said lifting member to said carrying wheel, a lifting arm having one end thereof pivoted to said frame and the other end thereof pivotally connected to said lifting member, a housing secured to said axle having an upwardly extending arm, a bell-crank roller dog pivoted to said arm and engageable with the lug on said lifting member for locking said lifting member and said frame in an elevated position, a control lever pivoted to said housing and engageable with said bell-crank roller dog for unlocking said dog from said lifting member for lowering said frame and plow to their working position.

5. In an agricultural implement of the character described, the combination with an axle and a wheel, of a housing member secured to said axle, an oscillatory lifting member journaled on said axle, a corrugated member carried by said wheel, a spring actuated roller arm carried by said lifting member for cooperation with said corrugated member, and means carried by said housing and cooperating with said lifting member to positively lock said lifting member thereto and hold said frame in its elevated position.

6. In an agricultural implement of the character described, the combination with a frame, an axle, and a wheel, of a housing member secured to said axle, an oscillatory lifting member journaled on said axle, a corrugated member carried by said wheel, a spring actuated roller dog carried by said lifting member for cooperation with said corrugated member to be actuated thereby, a lifting arm having one end thereof pivoted to said frame and the other end thereof pivoted to said lifting arm, and means carried by said housing and engageable with said lifting member whereby the lower end of said lifting arm may be locked in a position slightly short of the line passing through the axes of said axle and the pivot of said lifting arm with said frame.

7. In an agricultural implement of the class described, the combination with a frame, an axle and a carrying wheel, a housing secured to said axle, an oscillatory lifting member journaled on said axle, a corrugated member carried by said wheel, a spring actuated roller dog carried by said lifting member for cooperation with said corrugated member, a spring actuated roller dog carried by said housing and adapted to engage a lug on said lifting member for locking said frame in an elevated position, and a control lever pivoted to said housing having means thereon engageable with said second named roller dog for unlocking the latter from said lifting arm whereby said frame may drop by gravity to its working position.

8. In an agricultural implement of the character described, the combination with a frame, an axle and a wheel, a housing member secured to said axle, an oscillatory lifting member journaled on said axle, a corrugated member carried by said wheel, a spring actuated roller dog carried by said lifting member for cooperation with said corrugated member, a lever plate pivoted to said housing and adapted to cooperate with said roller dog, a second roller dog carried by said housing and adapted to cooperate with said lifting member for locking said frame in an elevated position, and a lever pivoted to said housing having means thereon for actuating said plate and controlling said second named roller dog whereby said lifting member may be unlocked and said frame lowered to said working position.

9. In an agricultural implement of the class described, the combination with a frame, an axle, and a wheel, a housing secured to said axle, a lifting disc journaled on said axle, a corrugated member carried by said wheel, a normally spring actuated roller dog carried by said disc for cooperation with said corrugated member, a lever cam plate pivoted to said housing for cooperation with said roller dog, a lifting arm having one end thereof pivoted to said frame and the other end thereof pivoted to said lifting disc, means whereby said roller dog may be actuated to become disengaged from said corrugated member when the lower end of said lifting arm reaches an elevated position slightly short of dead center, a second roller dog pivoted to said housing and engageable with said lifting disc for locking said frame in an elevated position, and a hand operated lever pivoted to said housing and engageable with said last named roller dog to unlock the same from said disc to lower said frame to working position.

10. In an agricultural implement of the class described, the combination with a frame, an axle and a lifting wheel, a housing secured to said axle, an oscillatory lifting disc journaled on said axle, a corrugated member carried by said wheel, a spring actuated roller dog carried by said disc for cooperation with said corrugated member, a lever cam plate pivoted to said housing for cooperation with said roller dog, a lifting arm having one end thereof pivoted to said frame and the other end thereof pivoted to said lifting member, means for disengaging said roller dog from said corrugated member when the lower end of said lifting arm reaches a position slightly short of dead center, a locking dog pivoted to said housing and adapted to engage the lug on said lifting member for locking said frame in an elevated position, a lever pivoted to said housing and a roller trip carried by said lever and engageable with said last named roller dog for disengaging the same from said lifting member for lowering the said frame from its elevated position.

In testimony whereof we have signed our names to this specification, on this 13 day of March A. D. 1930.

RUDOLPH J. ALTGELT.
CAMERON H. GEMBERLING.